United States Patent [19]
Andreasen

[11] 3,879,004
[45] Apr. 22, 1975

[54] VEHICLE DETECTION, SIGNALING AND COMMUNICATION SYSTEM

[75] Inventor: Charles Andreasen, Rochester, N.Y.

[73] Assignee: General Signal Corporation, Rochester, N.Y.

[22] Filed: Oct. 1, 1973

[21] Appl. No.: 402,414

[52] U.S. Cl................................. 246/62; 246/34 R
[51] Int. Cl............................................. B61l 21/06
[58] Field of Search ..................... 246/7-9, 34 B, 246/34 R, 63 C, 37, 187 B, 182 R, 62

[56] References Cited
UNITED STATES PATENTS

| | | | |
|---|---|---|---|
| 1,053,693 | 2/1913 | Ames | 246/7 |
| 1,389,258 | 8/1921 | MacFarlane | 246/7 |
| 2,731,550 | 1/1956 | Stafford | 246/182 R |
| 3,328,581 | 6/1967 | Staples | 246/37 |
| 3,501,629 | 3/1970 | Aiken | 246/187 B |

*Primary Examiner*—M. Henson Wood, Jr.
*Assistant Examiner*—Reinhard J. Eisenzopf
*Attorney, Agent, or Firm*—Pollack, Philpitt & Vande Sande

[57] ABSTRACT

A vehicle detection, signaling and communication system which employs a single sectionalized conductor for all three purposes. Vehicles are detected and located through the use of vehicle detection energy which is placed upon the various sections of the conductor. The vehicle carries shunting means to conductively engage the conductor and shunt sufficient current from the conductor so that a relay, normally energized by vehicle detection energy on said conductor, is dropped away. Vehicle traffic signaling current is also placed on the conductor and is conductively transmitted to the vehicle through the same apparatus which causes the vehicle detection energy to be shunted. Additionally, further information is transmitted to and from the vehicle through the same means to the conductor.

13 Claims, 2 Drawing Figures

VEHICLE DETECTION, SIGNALING AND COMMUNICATION SYSTEM

BACKGROUND OF THE INVENTION

Vehicle detection, signaling and communication systems have been in use for many years. The prime example of a vehicle detection system is the well-known track circuit in which vehicle detection energy is transmitted through the track rails themselves. The steel train wheels shunt this vehicle detection energy away from a relay when the train is in the block of track associated with that relay. The dropping away of this relay indicates the presence of a train. In systems which use the track circuit referred to above, it is not uncommon to also transmit traffic signaling information from the wayside to the vehicle in the same rails. However, the traffic signaling information must be received and detected in advance of the train wheels for the reason that the wheels will shunt the signaling information as well as the vehicle detection energy. For this reason, many systems employ inductive coils mounted above and in front of the front wheels of the train to pick up the signaling energy.

Recently, however, a number of mass transit applications have been proposed which do not utilize the steel wheel riding on a steel rail, for reasons which are not pertinent to this invention. In those applications, the absence of the steel wheel — steel rail combination makes it impossible to utilize the vehicle detection and vehicle signaling systems common in the prior art.

In the mass transit application area, there has been a noticeable trend toward more sophisticated systems which require larger and larger amounts of information. In many systems, information flows not only from the wayside to the vehicle but an information flow path is also required from the vehicle to the wayside. When the application involved the steel wheel — steel rail combination, one solution was to provide this information flow from the vehicle to the wayside through an inductive loop laid between or adjacent the track rails. The result was three different systems using three different combinations of apparatus to perform the vehicle detection, vehicle traffic signaling and communication functions. It should be apparent that this solution had a number of drawbacks, mainly related to the multiplication of equipment that had to be maintained in operating order.

Applicant sought to provide a single communication path for vehicle detection energy, vehicle traffic signaling and communication purposes. Furthermore, it is desirable for this path to utilize as much common equipment as was possible in order to minimize the multiplication of equipment required in the system.

SUMMARY OF THE INVENTION

Briefly, the invention is characterized by the use of a single sectionalized conductor for transmitting vehicle detection energy, vehicle traffic signaling and communication purposes. Furthermore, apparatus carried on board the vehicle conductively engages the sectionalized conductor and perform the following three functions:

1. shunting of vehicle detection energy to indicate vehicle presence,
2. coupling vehicle traffic signaling information from the conductor to the vehicle, and
3. coupling communication information to and from the vehicle.

The conductor is sectionalized and means are associated with each section of the conductor to detect the presence of vehicle detection energy. If such energy is present at the detection means, then it is apparent that the traffic block associated with the section is unoccupied. On the other hand, if the wayside detection means does not detect sufficient vehicle detection energy, it is for the reason that the associated traffic block is occupied by a vehicle and appropriate indications are made.

BRIEF DESCRIPTION OF THE DRAWINGS

The invention will be described in this specification taken in conjunction with the attached drawings in which.

DETAILED DESCRIPTION OF THE INVENTION

Figure 1:
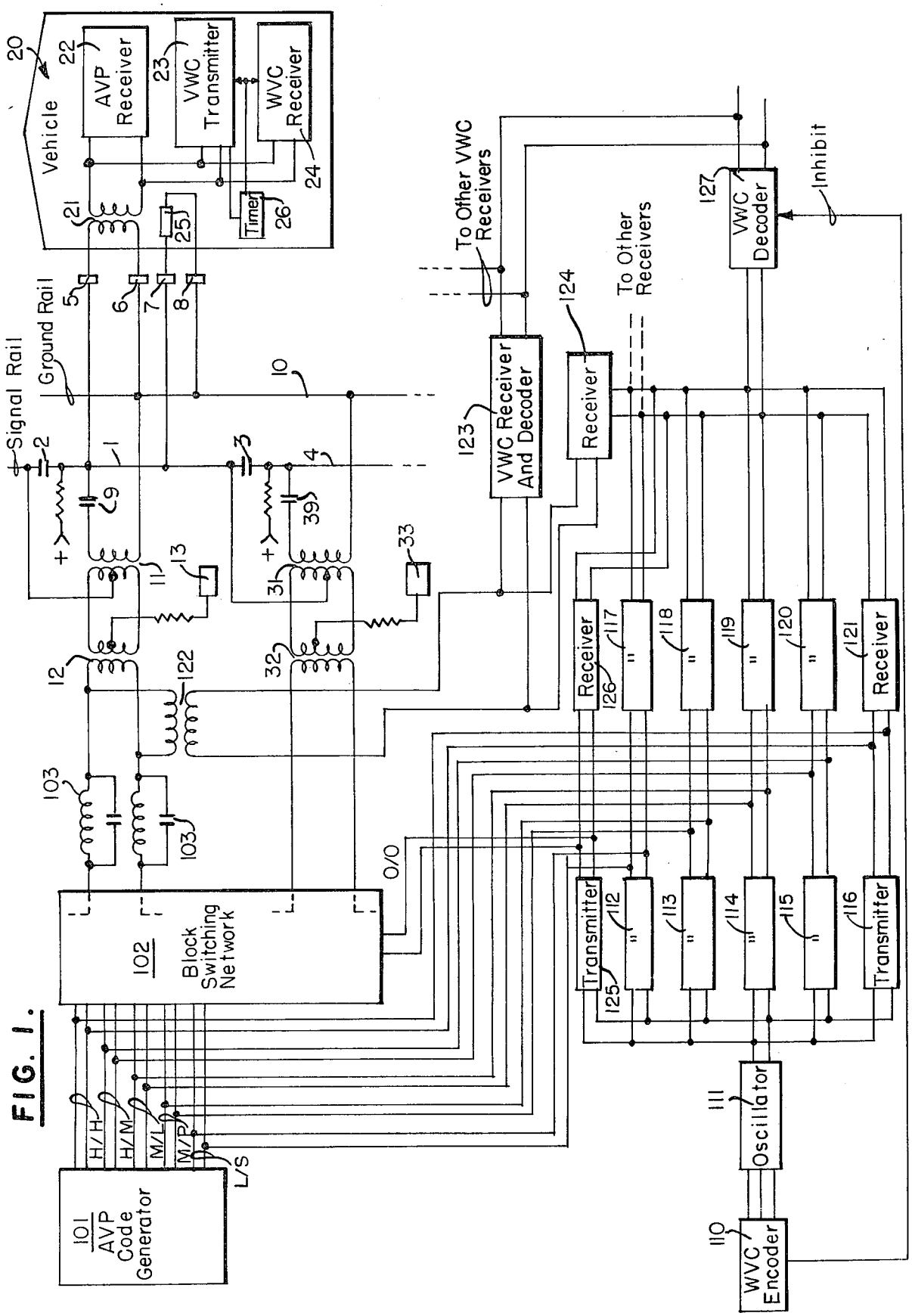
FIG. 1 is a schematic of the vehicle detection, vehicle signaling and vehicle communication systems constructed in accordance with the present invention.

Before getting into a detailed discussion of what is represented in FIG. 1, it will be useful to relate how the apparatus shown in FIG. 1 relates to a practical operating system. As is conventional in railroad traffic control, the apparatus used in conjunction with the present invention divides the traffic area to be controlled into blocks. Each block is treated as a unit, and it is either occupied or unoccupied. Therefore, if any portion of a block is occupied, the entire block is considered to be occupied. The blocks and the block boundaries are defined by the sectionalized signal rail or conductor. Each section of the signal rail or conductor is considered a block and the boundaries of the sectionalized signal rail or conductor are considered the block boundaries of the block associated with that signal rail. FIG. 1 shows a single block and portions of a block on either side of the single block. In actual practice, of course, an area to be controlled would comprise many blocks, even hundreds of blocks. In applying the principles of the present invention it has been found that it is practical for the apparatus illustrated in FIG. 1 to operate on the order of 100 to 200 blocks. In systems with a greater number of blocks, duplicate apparatus would be provided, of course.

The system transmits two kinds of information to the vehicles. The first type of information communicated from wayside to vehicle is speed limits and speed commands which information is based upon traffic conditions in advance of the vehicle. The second type of information transmitted to the vehicle concerns supervisory information consisting of special speed modifiers, for reasons not dictated solely by traffic alone, and particularly requests for particular vehicles to transmit certain information to the wayside. The vehicles operating in this system are identified by unique identification numbers through which a specific vehicle can be identified and interrogated. When interrogated, the vehicle can transmit to the wayside information related to its route, its speed, the signals it has received and decoded from the wayside, any malfunction information as well as other types of information which will be specified hereinafter. For purposes of relating the showing in FIG. 1 to a practical operating system, the messages transmitted to the vehicle are received by a decoder. The manner in which the message content is determined forms no part of the present invention. In addition, when the vehicle carried information is transmitted to the wayside, it is decoded. The manner in which apparatus interprets this decoded information also forms no part of the present invention.

In discussing the apparatus shown in FIG. 1 we will first refer to the vehicle detection components. A positive source of potential (+) supplies vehicle detection energy to the sectionalized signal rail through a resistor. A sectionalized signal rail 1 is associated with traffic block 1 whose boundaries are shown by the insulated joints 2 and 3. A second sectionalized signal rail 4, associated with traffic block 4, is shown in FIG. 1. A ground rail 10 is also shown which extends parallel with the sectionalized signal rail. A capacitor 9 connects the signal rail 1, at the point of application of vehicle detection energy, with one winding of a transformer 11. The other winding of transformer 11 is connected across a winding of a transformer 12. The center tap of the other winding of transformer 11 is connected to the section of signal rail next in the direction of traffic of movement. The winding of transformer 12, referred to above, has its center tap connected, through a resistor to a relay 13.

The vehicle 20 has a number of brushes schematically shown in FIG. 1 as brushes 5, 6, 7, and 8. Brushes 5 and 7 conductively engage the sectionalized signal rail while brushes 6 and 8 conductively engage the ground rail. The wire connection shown between the brush 5 and the signal rail 1, for instance, is only schematically illustrating that brush 5 and rail 1 are electrically common and in fact, no such wire connection is utilized. Instead brushes 5 and 7 ride along the rail making electrical contact. In a similar manner brushes 6 and 8 ride along the ground rail also making electrical contact. Connected between brushes 5 and 6 on board the vehicle is one winding of a transformer 21. The other winding of transformer 21 is connected in parallel to the AVP (automatic vehicle protection) receiver 22, VWC (vehicle wayside communication) transmitter 23, and WVC (wayside vehicle communication) receiver 24. A relay 25 is connected between brushes 7 and 8.

The foregoing apparatus provides the vehicle detection components for a traffic block associated with signal rail 1. Associated with signal rail 4 is another vehicle detection energy supply (+) connected to the signal rail 4 through a resistor. Associated with the signal rail 4 are capacitor 39, transformers 31 and 32, and relay 33 much in the same manner that capacitor 9, transformers 11 and 12, and relay 13 are associated with signal rail 1.

Similar apparatus is associated with each of the different sectionalized signal rails in the territory. In operation, with no vehicle present in the traffic block associated with signal rail 1, for instance, the positive source of energy supplied to signal rail 1 flows through the signal rail, to the center tap of transformer 31, through the center tap of transformer 32, through the resistor to the relay 33, energizing that relay. In a similar fashion, if no traffic is present in the block in advance of signal rail 1, the vehicle detection energy supplied to that signal rail will flow through it, through the center tap of the winding of transformer 11, the center tap of the winding of transformer 12, through the resistor and energize relay 13. When a vehicle enters the block associated with signal rail 1, for instance, the brushes 5 and 6 shunt sufficient current from the signal rail to the ground rail to cause the relay 33 to drop away. Dropping away of relay 33 indicates that there is a vehicle in the traffic block associated with the signal rail 1. In contrast to conventional track circuits in which the goal is to have the steel wheels shunt as much track circuit current as possible, the signal rail current shunted to the ground rail through the winding of transformer 21 is sufficient to cause the vehicle energy detection relay (33, for instance) to drop away although sufficient current still flows in the signal rail 1 for other purposes. The current that does flow in the signal rail 1 in the presence of brushes 5 and 6, is connected, through brush 7, to a relay 25, on board the vehicle. Relay 25, when picked up, indicates that brushes 7 and 8 are operative. In actual practice, each vehicle has four sets of brushes, each set including at least one brush for the signal rail and another brush for the ground rail. Each set of brushes is located at a different corner of the vehicle, one set at the left front, another set at the right front, a third set at the right rear, and a fourth set at the left rear. Normally, only two of the four vehicle sets of brushes are operative at any one time since the signal rail and ground rail are located on the wayside either adjacent the left or the right side of the vehicle.

Now that the vehicle detection system has been explained, we will explain the automatic speed control of vehicles from the wayside.

AVP code generator 101 produces five different signals, each on a separate pair of line wires. These signals will be referred to as H/H, H/M, M/L, M/P, and L/S. The character of these signals and the method of generating them forms no part of the present invention but the apparatus required to generate these signals is described more fully in the application of R. Eblovi (GR-358), Ser. No. 402,415, filed on Oct. 1, 1973, assigned to the assignee of this invention. Each of these signals is supplied to block switching network 102. The block switching network comprises a switching arrangement for each of the different sections of signal rail and thus for each of the different traffic blocks. The block switching network arrangement for each particular block consists of contacts of the vehicle detection energy relays (such as 13 and 33) in advance of the block with which the switching arrangement is associated. Thus, for instance, if the four blocks in advance of the traffic block 1 are all unoccupied, as indicated by the closed contacts of the vehicle detection energy relays for each of the four blocks in advance of block 1, the signal H/H is selected for transmission to block 1. This signal is provided through the conductors connecting the block switching network 102 with the winding of transformer 12. The L-C combinations 103 in these conductors have a negligible effect on these signals. The purpose of the L-C combinations 103 will be explained later. In any event, the signal selected by the block switching network 102 for the signal rail 1 is transmitted through the transformer 12, through the transformer 11, through capacitor 9 to the signal rail 1. From the signal rail 1 the signal is picked up by brush 5 and supplied to a winding of the transformer 21. The other winding of transformer 21 supplies this signal to the AVP receiver 22. The AVP receiver 22 is distinctively responsive to the signal selected by the block switching network. That is, the receiver responds to the particular signal transmitted to it in dependence upon the signal it has received. Since this signal was selected in accordance with traffic conditions ahead of the vehicle, the vehicle thus receives an indication of the maximum allowable safe speed and the desired optimum speed of travel. The apparatus which responds to the signals received by the AVP (automatic vehicle protection) receiver to control the vehicle is disclosed in the copending application of S. Macano (GR–355), Ser. No. 401,727, filed Sept. 28, 1973, assigned to the assignee of this application.

Regardless of the traffic conditions in advance of a particular vehicle, one of the five signals would be selected by the block switching network 102 associated with the block in question for transmission to the block. The only exception is when the block immediately in advance of a specific block is occupied. Under these circumstances, no signal is transmitted since there should, under proper conditions, not be a vehicle in the block immediately behind an occupied block.

In one practical embodiment constructed in accordance with this invention, the signals H/H through L/S lie in the frequency range between four kilohertz and 12 kilohertz. The communication system, which will now be discussed, is based on carrier frequencies between 13 kilohertz and 21 kilohertz. Of course, the frequencies utilized in any actual system can be varied from those discussed above so long as it is possible for filters to distinguish between the signals destined for the AVP receiver, the the WVC receiver as well as signals destined for the VWC receivers.

The communication system includes transmission of information from the wayside to the vehicle and from the vehicle to the wayside. We will first discuss the transmission of information from the wayside to the vehicle.

An encoder 110 receives digital information which is representative of the message to be transmitted to the vehicle. The encoder 110 controls as oscillator 111 in accordance with the information received by the encoder 110. Oscillator 111 drives a plurality of transmitters 112 through 116 and 125. These transmitters are identical save that each transmits on a separate pair of line wires. The output from the transmitters 112 through 116 are connected respectively to one of the line wires which carry the AVP signals from the AVP code generator 101 to the block switching network 102. A block behind an occupied block does not receive one of the five AVP signals. A different transmitter 125 is provided to communicate with each station block. In this manner, all blocks receive a WVC (wayside to vehicle) message if such has been transmitted from one of the transmitters 112 through 116 and 125. By reason of the frequency of transmission, the message, when received aboard the vehicle, operates the WVC receiver 24, only.

The same communication path which carries WVC messages, that is, from one of the transmitters 112 through 116 and 125 through the block switching network through one of the sectionalized signal rails through the vehicle carried brushes to the WVC receiver 24 is also capable of carrying information in the reverse direction. In particular, this information originates at the VWC transmitter 23. It is transmitted through the transformer 21, through the brushes 5 and 6 to one of the sectionalized signal rails, through the transformers 31 and 32, through the block switching network 102 and thence through one of the five pairs of line wires to one of the receivers 117 through 121 and 126. Of course, to distinguish VWC transmissions from WVC transmissions, the carrier frequency for these transmissions are different.

The apparatus associated with signal rail 4 illustrates the conventional or general purpose block. For a variety of reasons, some blocks are treated as special purpose communication blocks in which VWC communications are handled differently from the manner in which they are handled in the general purpose block. One such block is associated with sectionalized signal rail 1. In particular, the L-C combinations 103 provide traps at the frequency of VWC transmission. These traps inhibit the transmission of VWC communications from the vehicle into the block switching network. Instead, a transformer 122 has one winding connected across one winding of transformer 12. In these communication blocks, the VWC transmissions are coupled from the vehicle brushes 5 and 6 through the sectionalized signal rail through the transformers 11, 12, and 122. The output of transformer 122 is coupled in parallel to VWC receiver and decoder 123 and VWC 124. The reason for this arrangement will become apparent as the operation of this system is discussed. In actuality, all the signals transmitted to and from the vehicle are coupled through transformer 122 but since the receivers 123 and 124 are turned only to the VWC transmission frequency, only those signals are received and decoded.

The reasons for the use of special communication blocks are varied but they all have the common characteristic that some information is required from the vehicle when it reaches the area of the communication block. This area can, for instance, be in advance of a diverging switch. In that instance, the information required from the vehicle would relate to the vehicle's route so the switch could properly be positioned. In another instance, a communication block would be utilized in a station area so that the wayside equipment would be informed as to the vehicle's identity in order to determine whether or not the vehicle was to stop at that particular station.

The last element represented in FIG. 1 is the VWC decoder 127. The VWC decoder 127 is coupled to all of the VWC receivers 117 through 121, 124 and 126, except the VWC receiver and decoder 123. The VWC decoder 127 is also connected to the WVC encoder 110 for purposes of inhibiting the VWC decoder 127 during the WVC transmissions.

Figure 2:
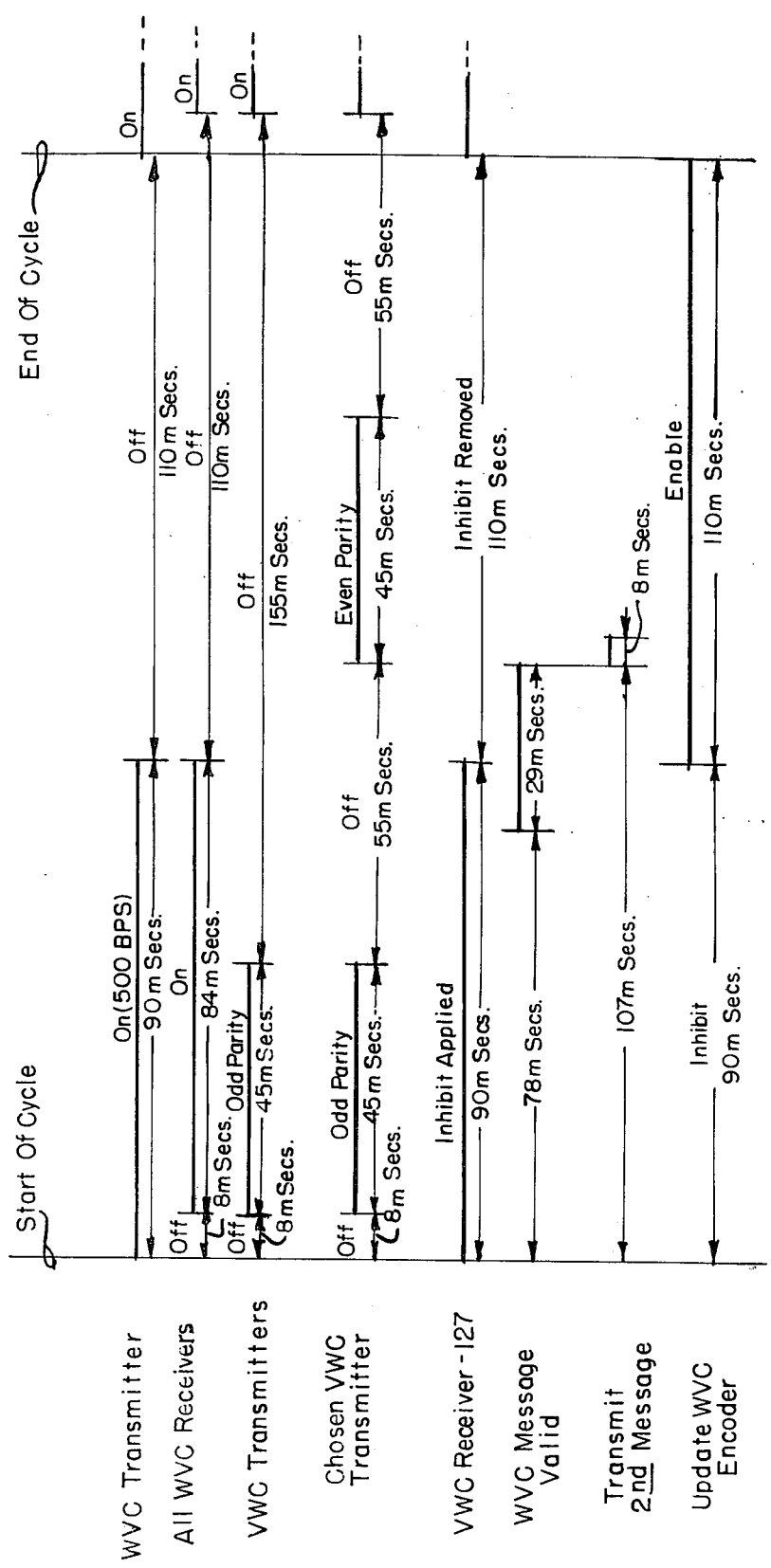
FIG. 2 is a timing diagram illustrated when the various components of the communication system are operative.

Before discussing FIG. 2 which illustrates the operating cycle of the communication system, it will be helpful to understand the content of the communication messages.

In one embodiment constructed in accordance with the principles of this invention, the WVC transmission was at a 500 bit per second rate and included seven bits of ID information, identifying a particular vehicle, and nine bits of control information. This control information could include route change requests, to change the vehicle stored route, or other non-vital commands. The VWC message is transmitted at a 1,000 bit per second rate and it includes seven bits of ID information, again identifying the vehicle transmitting, four bits for birthing and malfunction information and five bits for route information. The birth information bits relate to whether or not a vehicle had detected itself properly stopped at a station. The malfunction bits identify the different classes of malfunction that a vehicle has recognized. For instance, if the relay 25 on board the vehicle is not picked up, this is recognized as one particular type of malfunction. This information is stored and transmitted to the wayside during a VWC transmission. The vehicle route is stored on the vehicle as a five bit word. The vehicle route, when transmitted to the wayside, allows proper positioning of the switches in advance of the vehicle. We discuss below that the VWC transmitter 23 transmits two different types of messages, the first message is formatted as an odd parity message while the second type of message is formatted as an even parity message. The VWC receiver and decoder 123 is arranged to receive only odd parity messages.

Referring now to FIG. 2, this shows the operating cycle of the apparatus as a function of time. Under normal operating conditions, the VWC transmitter is slaved to the WVC transmitter such that the WVC transmitter controls the operating cycle. Therefore, we will begin with the WVC transmitter. This initiates the cycle by transmitting a 90 millisecond message at a 500 bit per second rate. During this 90 millisecond period of time, the WVC decoder 124 is inhibited. The WVC transmitter is then off for 110 milliseconds during which time the inhibit signal is removed from the WVC receiver 124. Thus, the cycle comprises 200 milliseconds in time. The WVC receiver is on board the vehicles all receive the WVC transmission and after approximately 8 milliseconds respond thereto. Thus, the WVC message is received for an 84 millisecond period of time. The VWC transmitters are slaved to the WVC transmitter through the WVC receivers. After the 8 millisecond delay the VWC transmitters are initiated for a 45 millisecond message. Since the VWC transmitters transmit at a higher rate than the WVC transmitter, the VWC transmitters complete their transmission prior to the completion of the WVC transmission. As has been mentioned, this first VWC transmission is formatted as an odd parity message. Since only the VWC receiver and decoder 123 can receive odd parity messages only that receiver is capable of responding to this first transmission. Since the VWC receiver 123 is associated only with the communication blocks, only those vehicles present in a communication block have their first VWC transmissions received. FIG. 2 shows both the VWC transmitters, in general transmitting a 45 millisecond odd parity message and also the chosen VWC transmitter transmitting a 45 millisecond odd parity message. The chosen VWC transmitter refers to the vehicle whose identity has been transmitted by the WVC transmission. However, the first VWC transmission is not in response to receipt of the vehicle ID but rather is in response to the WVC transmission in general.

On board the vehicle the WVC receiver 24 determines whether or not a valid message has been received. If it has, a message valid signal is generated.

On board the chosen vehicle, not only is the message valid received but a match exists between the ID transmitted during the WVC transmission and the vehicle ID. The VWC transmitter, after the first 45 millisecond transmission, is off for 55 milliseconds during which time the message valid and ID checks are made. On board the chosen vehicle, at the conclusion of the 55 millisecond period of time, a second 45 millisecond message is transmitted. This message includes status information concerning the particular vehicle that had been addressed. At the conclusion of the 45 millisecond message, the VWC transmitter is again off for 55 milliseconds until it transmits again in response to a WVC transmission.

For a vehicle which is not in a communication block the second VWC transmission follows the path which is outlined below. From the brushes 5 and 6, it flows into a signal rail, such as 4, thence through transformers 31 and 32, thence through the block switching network 102 through one of the selected line wire pairs to one of the receivers 117 through 121 or 126. During this period of time, the inhibit has been removed from the VWC decoder 127 and thus it is capable of receiving and decoding the VWC transmission. If, however, the chosen vehicle happens to be in a communication block, then the transmission path for the VWC transmission will include the vehicle brushes 5 and 6, the signal rail 1, for instance, the transformers 11, 12, and 122 and the receiver 124. From the receiver 124, the message will be applied to the VWC decoder 127. The VWC receiver and decoder 123 will not respond to the message since this is an even parity message and that receiver responds only to odd parity messages.

Subsequent to the initial VWC transmission which initiated the cycle, during the 110 millisecond period of time when the WVC transmitter is off, the encoder 110 can be updated with a new ID and new control bits for the next WVC transmission cycle.

Thus, during any one cycle, the WVC transmission selects a particular vehicle for interrogation and also receives information from every vehicle which is within a communication block. During that same transmission cycle, the chosen vehicle also responds, regardless of its position. Although all of the receivers are in common, there will only be one chosen vehicle in the control territory and thus only one chosen vehicle response would have to be processed through these receivers.

In the foregoing description reference has been made to the block switching network 102. A number of examples of block switching arrangements are disclosed in copending application of R. Eblovi (GR-358), Ser. No. 402,415, filed on Oct. 1, 1973, assigned to the assignee of this application. The description of these typical block switching arrangements is incorporated herein by reference.

Although the system described so far is safe even when the communication system per se is not operating, it should be apparent that the system is much more efficient when the communication system is operative. For instance, if for some reason a vehicle does not receive the WVC transmissions, it will not respond with VWC transmissions, since the VWC transmitter is slaved to the WVC transmitter. Under these circumstances, the vehicle will not cause any unsafe conditions, its presence will still be detected, and it will be protected from following vehicles. However, switches may not be properly thrown because of the absence of the VWC transmission means that the wayside has no way of knowing the vehicle's route and the vehicle may not be stopped at the proper station since again, the wayside equipment is not informed as to the identity of the vehicle. To overcome these difficulties in situations when a vehicle does not receive the WVC transmission, a timer 26 is provided on board the vehicle. This timer is reset every time a WVC transmission is received. If the timer times out, for instance, 5 seconds, without receiving a WVC transmission, then the VWC transmitter will transmit periodically in order to inform the wayside of the vehicle's identity and route. Thus, normally, the VWC transmitter is slaved to the WVC transmitter but, however, when the WVC transmission has not been received for a predetermined period of time, the VWC transmitter is periodically initiated in the absence of the WVC transmission.

From the foregoing description it should be apparent that the applicant has succeeded in providing a vehicle detection and communication system which employs a large amount of common equipment. The vehicle detection energy is carried by a sectionalized signal rail or conductor which also carries communications from the wayside to the vehicle and from the vehicle to the wayside. Vehicle detection is effected by shunting current through brushes carried by the vehicle which are conductively engaged with the signal rail or conductor. The communications and signaling also travel over this sectionalized conductor through the same vehicle carried brushes to and from the vehicle. Although reference has been made in portions of this specification to particular operating frequencies and ranges of frequencies, it should be apparent that these can be varied to suit the requirements of the particular applications so long as the vehicle signaling information, the WVC transmission and VWC transmission can all be distinquished one from another through the use of frequency selective networks.

What is claimed is:

1. A vehicle detection and communication system comprising,
   a sectionalized conductor provided with energy of one type and detecting means connected to each section of said sectionalized conductor and responsive only to energy of said one type,
   first means for transmitting control signals to each section of said sectionalized conductor distinctive of traffic conditions in advance of said section,
   second means for transmitting communication signals to each section of said sectionalized conductor, and first vehicle carried means conductively engaging said sectionalized conductor for providing a low impedance path to ground for said energy of one type and for carrying said control and communication signals between said sectionalized conductor and said vehicle.

2. The apparatus of claim 1 which further includes, second vehicle carried means coupled to said first vehicle carried means distinctively responsive to said control signals, and third vehicle carried means coupled to said first vehicle carried means presenting a low impedance path to ground for energy of said one type.

3. The apparatus of claim 2 which further includes fourth vehicle carried means coupled to said first vehicle carried means and responsive to said communication signals.

4. The apparatus of claim 3 in which said fourth vehicle carried means includes a transmitter coupled to said first vehicle carried means for, at times, transmitting communication information.

5. The apparatus of claim 1 in which said first vehicle carried means comprises at least two brushes conductively engaging said sectionalized conductor, one of said brushes providing a low impedance path to ground for energy of said one type,
   vehicle carried detecting means,
   said other brush being connected to said vehicle carried detecting means.

6. The apparatus of claim 5 in which said second means includes,
   transmitting means for, at times, transmitting information to each section of said sectionalized conductor and vehicle carried transmitting means connected to said first vehicle carried means.

7. The apparatus of claim 6 which further includes vehicle carried receiving means connected to said first vehicle carried means and to said vehicle carried transmitting means for initiating operation of said vehicle carried transmitting means in response to receipt by said vehicle carried receiving means of information from said transmitting means.

8. The apparatus of claim 7 further including timing means connected to said vehicle carried receiving means and to said vehicle carried transmitting means for initiating operation of said vehicle carried transmitting means in the absence of receipt by said vehicle carried receiving means of information, transmitted by said transmitting means.

9. Vehicle carried apparatus manifesting vehicle presence and for providing a path for control and communication signals between said vehicle and wayside apparatus, cooperating with a single sectionalized conductor which carries vehicle detecting energy of one type, control information and communication information comprising energy of a type different from said energy of one type, said vehicle carried apparatus comprising,
   first means conductively engaging said sectionalized conductor,
   second means coupled to said first means and presenting a low impedance path to ground to energy of said one type,
   control receiving means distinctly responsive to said control information,
   said second means coupled to said control receiving means,
   and communication transceiver means coupled to said second means for reception and transmission of communication information to and from said vehicle.

10. The apparatus of claim 9 in which said second means includes a transformer with a primary winding connected between said first means and ground, said transformer secondary coupled to said control receiving means and to said communication transceiver means.

11. The apparatus of claim 9 in which said communication transceiver means includes a transmitter and a receiver.

12. The apparatus of claim 11 in which transmitter operates in response to reception of information by said receiver.

13. The apparatus of claim 12 which further includes timing means coupled to said transmitter and to said receiver to operate said transmitter if said receiver does not receive information in a predetermined period.

* * * * *